United States Patent
Steer et al.

(10) Patent No.: US 7,647,061 B1
(45) Date of Patent: Jan. 12, 2010

(54) SYSTEM, METHOD AND APPARATUS FOR RELIABLE DETECTION OF EXTRA SYSTEM SIGNALS FOR A MULTI-NODE RLAN SYSTEM

(75) Inventors: David Steer, Nepean (CA); Koon Hoo Teo, Nepean (CA); Adrian Smith, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 895 days.

(21) Appl. No.: 11/085,084

(22) Filed: Mar. 22, 2005

Related U.S. Application Data (60) Provisional application No. 60/554,986, filed on Mar. 22, 2004.

(51) Int. Cl.
*H04B 17/00* (2006.01)

(52) U.S. Cl. ............... 455/509; 455/67.13; 455/446; 455/452.2

(58) Field of Classification Search ............. 455/447, 455/446, 435.2, 353, 562.1, 403, 452.2, 502, 455/507, 509, 452.1, 524, 67.11, 67.13, 134, 455/135, 422.1
See application file for complete search history.

(56) References Cited

U.S. PATENT DOCUMENTS

| | | | |
|---|---|---|---|
| 7,194,269 B2 * | 3/2007 | Sydor | 455/446 |
| 2004/0157580 A1 * | 8/2004 | Stadelmeier et al. | 455/338 |
| 2005/0102443 A1 * | 5/2005 | Mahany et al. | 710/18 |
| 2005/0148332 A1 * | 7/2005 | Buckley et al. | 455/435.2 |

\* cited by examiner

*Primary Examiner*—John Lee (57) ABSTRACT

A method of detecting extra-system signals in a multi-node RLAN (radio local area network) involves: at each of a plurality of nodes in the RLAN, processing at least one respective received signal to produce detection results and deciding whether an extra-system signal has or has not been detected based on detection results of at least two of the plurality of nodes. The extra-system signal is for example a signal from a RADAR system. The detection results are produced using pulse pattern matching for example. Furthermore, in some implementations a decision as to whether an extra-system signal has or has not been detected is based on a comparison of a detection signature for at least two of the nodes to see if there is a substantial match. In some implementations the decision is further based on information representative of a direction of arrival of respective received signals.

16 Claims, 6 Drawing Sheets

SYSTEM, METHOD AND APPARATUS FOR RELIABLE DETECTION OF EXTRA SYSTEM SIGNALS FOR A MULTI-NODE RLAN SYSTEM

RELATED APPLICATION

This Application claims the benefit of U.S. Provisional Application 60/554,986 filed Mar. 22, 2004.

FIELD OF THE INVENTION

The invention relates to multi-node radio local area networks.

BACKGROUND OF THE INVENTION

In a multi-node Radio Local Area Network (RLAN) communication system it is often necessary to detect the presence of other radio services that may be sharing the same radio band. The RLAN system may need to avoid use of the radio channels that the other radio services are using.

Such a situation occurs in practice for RLAN systems operating in 5 GHz bands (e.g. 5.250-5.350 GHz and 5.470-5.725 GHz) that are shared with primary radio determination services such as RADAR systems. In this case the RLAN system is required to monitor and detect the RADAR signals and to select alternate channels when RADAR signals are detected. Generally, the interfering signals are difficult for the RLAN devices to distinguish from other in-band noise. The RLAN system must be careful to distinguish between RADAR signals and other sources of interference before electing to change its operation to a new channel as frequent reselection of a new channel by the RLAN will cause degradation in its performance.

Existing RLAN equipment makes use of an RLAN receiver to detect potentially interfering signals when the device is not transmitting. These signals are then filtered by matching their pulse width and inter-pulse timing against the defined patterns for the RADAR signals. If a pattern match is found (i.e. matching the pulse duration, pulse count, and pulse timing interval), the RLAN device abandons the channel it is currently using and looks for another channel that is free of RADAR signals. The regulations require that each new channel be scanned for at least a minute to determine that it is not being used by RADAR systems. This means that there is at least an interruption of a minute before the RLAN device can resume service to its subtending mobile nodes (i.e. a customer's laptop PCs). In the most common deployments of individual RLAN access points this interruption, while undesirable, may not be too objectionable. For applications such as Web-browsing, the interruption may be unnoticeable if the customer is reading a page and not downloading new material. Even if there is downloading during the interruption, the delay may be masked by the server response delays.

The IEEE sub-committee 802.11h has extended the 801.11 RLAN radio standard protocol to include messages and actions to permit the above solution for single access point deployments and for control of subtending mobile nodes.

For configurations such as a multi-node mesh network in which the RLAN channels are being used to carry concentrated traffic across a network from multiple nodes, any interruption, especially one as long as a minute, is a major disruption that will affect service to multiple customers. In addition, because of the heavy use of the RLAN channels in the multi-node network, there is increased intra-system noise and hence an increased possibility that the RLAN devices will falsely detect a RADAR signature and change channels unnecessarily, with consequent degradation of service. Only a very minimum interruption can be tolerated if, for example, the RLAN system is being used for high quality services such as speech (e.g. Voice over IP (VoIP)) or video streaming.

In some systems, the channels that are vacated due to the detection of a RADAR signal cannot be re-occupied by the RLAN system for at least half an hour after the last RADAR signal on the channel is detected. Thus, false detection and unnecessary channel re-assignments will quickly exhaust the supply of available channels. There are about 12 channels in the 5.470-5.725 GHz band.

SUMMARY OF THE INVENTION

It would be advantageous to improve the reliability of detection of RADAR signals within a group of shared RLAN channels for a multi-node RLAN system and to improve the efficiency with which the RLAN system scans for alternate free channels while continuing to carry traffic using links on other channels.

It would also be advantageous to have a new method and apparatus that reliably detects the presence of RADAR signals with low incidence of false detection within a multi-node RLAN system that is being used for general traffic including high QoS traffic such as VoIP.

Some embodiments of this invention provide a means and method for the multi-node RLAN system to reliably detect another system's signals and to also continuously monitor for interference-free channels without disruption to the RLAN performance.

Embodiments of the invention provide a method whereby a network of RLAN nodes, operating with (wireless or wired) mesh connectivity, can reliably detect the presence of RADAR signals with small probability of false detection error, and coordinate their operation to adapt to new channel conditions. Some embodiments make use of coordinated receiver detection and antenna capabilities among the multiple nodes of the mesh network to reliably detect the RADAR signals and use the signaling capabilities across the mesh network to coordinate the new channel assignments.

In-band RADAR signals are detected with high probability and with high probability of rejection of non-RADAR signals. This ensures that the RLAN system only defers channel usage when necessary and hence maintains its desired capacity performance. Also, some embodiments of the invention provide a method to efficiently scan for RADAR-free channels during operation for use as alternate channels. Such alternative channels are needed when a deferral is required due to the detection of in-band RADAR transmissions on a channel that is being used for inter-node communications. In some embodiments the nodes of the RLAN system typically use the same receiver for RADAR signal scanning as for the network traffic, and methods are provided to efficiently scan without significant loss of network capacity.

A technical problem that is addressed in some embodiments is the reliable distinction between RADAR signals from a multitude of noise, interference and other radio signals that are also in the band. As deference need only be given to the RADAR signals, the system will give better performance if it only changes channels when actually needed (i.e. the RLAN will have higher throughput due to fewer unnecessary channel re-selections). It would be advantageous if the system could accurately distinguish the noise from the RADAR signals.

Preferably a method is employed that does not involve an additional radio receiver in the RLAN nodes in order that there is no additional hardware cost. The RADAR detection problem is compounded by the fact that the RLAN system will also be making transmissions on the channel, and these transmissions will often mask the RADAR signature. The RADAR signals should therefore be detected even though only a partial sample of their signature pattern may be received while the RLAN transmitter is quiescent. In some embodiments, a quick deferral response is provided to a RADAR signal detection as the regulations may require the RLAN to vacate the channel in a time (i.e. a few seconds) that is less than needed for the full repetitive RADAR signature to be observed.

According to one broad aspect, the invention provides a method of detecting extra-system signals in a multi-node RLAN (radio local area network) comprising: at each of a plurality of nodes in the RLAN, processing at least one respective received signal for extra-system signals to produce detection results; deciding whether an extra-system signal has or has not been detected based on the detection results of at least two of the plurality of nodes.

In some embodiments, processing at least one respective received signal for extra-system signals to produce detection results comprises performing pulse pattern matching.

In some embodiments, the detection results for each node comprise a detection signature.

In some embodiments, deciding whether an extra-system signal has or has not been detected based on detection results of at least two of the plurality of nodes comprises comparing the detection signature for at least two of the plurality of nodes to see if there is a substantial match.

In some embodiments, deciding whether an extra-system signal has or has not been detected is further based on information representative of a direction of arrival of the respective received signals.

In some embodiments, a decision that an extra-system signal has been detected requires that the direction of arrival information of the respective received signals be substantially consistent.

In some embodiments, the decision that an extra-system signal has been detected is made when a majority of a node and neighbouring nodes of the node in the network detect a signal with a similar signature at substantially the same time.

In some embodiments, the decision that an extra-system signal has been detected is made when a majority of a node and neighbouring nodes of the node in the network detect a signal with a similar signature at substantially the same time and substantially the same direction.

In some embodiments, the RLAN communicates queries about neighbourhood detections and exchanges free channel information between nodes.

In some embodiments, the extra-system signal is a RADAR signal.

In some embodiments, the method further comprises: exchanging partial detection results among neighbouring nodes so that gaps in a detected pattern might be filled in.

In some embodiments, an omni-directional coverage is achieved using one of: an omni-directional antenna; all of the beams of a multi-beam directional antenna collectively giving an omni-directional coverage; some of the beams of each of a plurality of multi-beam directional antennas that collectively give an omni-directional coverage.

In some embodiments, each node has a plurality of directional antennas arranged to provide omni coverage; each node has active antennas which are being used for traffic; each node has respective inactive antennas which are not being used for traffic; in each node said at least one received signal is received using the respective inactive antennas.

In some embodiments, full omni scanning is achieved at a system level by combining results from multiple nodes which have different sets of active antennas and inactive antennas, and by sharing the results system wide.

In another embodiment, an RLAN system is provided comprising plurality of nodes each adapted to implement one of the methods as summarized above.

In some embodiments, the plurality of nodes comprises at least two nodes of a first class performing extra-system signal scanning and at least one node of a second class that relies on the scanning performed by the at least two nodes of the first class.

In some embodiments, the plurality of nodes defines a coverage area having edges and an interior, the at least two nodes of a first class being arranged at the edges of the coverage area for providing a detection fence and the at least one node of the second class being in the interior of the coverage area.

In some embodiments, the at least two nodes of the first class automatically assumes the responsibility of monitoring functionality, and wherein the at least one node of the second class automatically assumes a non-monitoring role.

In some embodiments, each node of the plurality of nodes automatically detects one of an edge status and an interior status of the node according to a number of communications links with neighbouring nodes of the node.

According to another broad aspect, the invention provides a node for participating in detecting extra-system signals in a multi-node RLAN (radio local area network), the node being adapted to: process at least one respective received signal for extra-system signals to produce detection results; and decide whether an extra-system signal has or has not been detected based on the detection results from at least one other node.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

In a multi-node Radio Local Area Network (RLAN) communication system detection of the presence of other radio services, such as RADAR services for example, which may be sharing the same radio band allows the RLAN communications system to avoid use of the radio channels that the other radio services are using.

Embodiments of the invention make use of various combinations of techniques to achieve reliable detection and low incidence of false detections. The techniques, which are combined in various ways, involve for example:

Partial pattern matching of RADAR signature;

Pattern seen by a majority of neighboring nodes, using centralised or distributed databases for example;

Pattern seen in a same direction of arrival at antennas;

Shared scanning of unused channels by two or more neighboring nodes (Shared scanning);

Scanning in all directions using combined beam with gain compensation; and

Use of node at an edge of a coverage area to provide a detection "fence".

Figure 1:
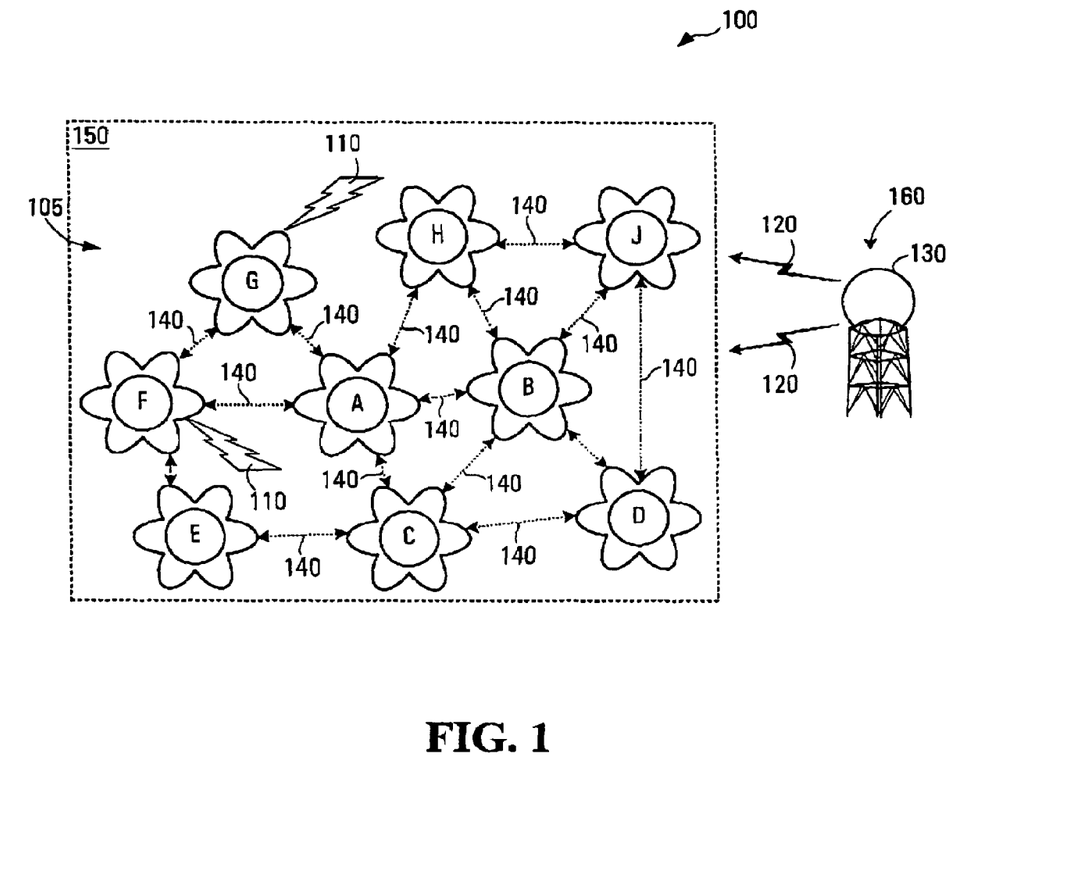
FIG. 1 is a diagram of an RLAN (Radio Link Access Network) system.

Referring to FIG. 1, shown is a diagram of a RLAN (Radio Link Access Network) system, generally indicated by 100. The RLAN system can be a WLAN (Wireless Local Area Network) systems for example.

The RLAN system 100 has RLAN (Radio Link Access Network) nodes A-J that communicate with each other using inter-node communications links 140 over an RLAN network 105. The RLAN network has coverage area 150. A RADAR system generally indicated by 160 is also shown having a RADAR transmitter 130 transmitting radar signals 120. A particular configuration of the RLAN system 100 is shown in FIG. 1; however, it is to be clearly understood that other configurations are possible. An arbitrary number and arrangement of RLAN nodes and links may be employed. Noise signals 110 are also receivable by the RLAN nodes A-J. Only one noise signal 110 is shown. The RLAN nodes A-J of the RLAN system 100 communicate among themselves using, for example, 5 GHz channels. These channels occupy frequencies that are common to those of the RADAR system operating nearby. The communications links 140 can also experience noise and other interference both from signals such as noise signal 110 received from other external sources (not shown) and as a result of re-use of the channels within the multi-node access network 100. Because of the high-power and location of the RADAR system 130, it will affect at least some of the RLAN nodes A-J by having the RADAR signals 120 "flood" the coverage area 150 of the RLAN system 100. In FIG. 1 the RADAR transmitter 130 is outside the coverage area 150 of the RLAN system 100. The RADAR signals 120 are detected by the nodes A-J using antennas. Because the RLAN nodes A-J may be relatively closely spaced (e.g. 100 to 200 meters), and due to the high speed of passage of radio signals (i.e. $c=3\times10^8$ meters/second) where c is the speed of the RADAR signals 120, the RADAR signals 120 will be received almost simultaneously at the RLAN nodes A-J. Some embodiments of the invention take advantage that at any particular instant in time the RADAR system 160 transmits across a wide area of the RLAN system 100, and from the perspective of the RLAN nodes A-J the RADAR signals 120 are received from a substantially uniform direction. This allows the RADAR signals 120 to be detected simultaneously by the RLAN nodes A-J. In some embodiments simultaneous detection of the RADAR signals 120 and/or the detection of the RADAR signals 120 from the uniform direction are used to confirm that the RADAR signals 120 originate from the RADAR system 160 and to reduce the probability of false detection.

The RLAN system 100 of FIG. 1 shows the RLAN nodes A-J communicating among themselves using communications links 140, which are wireless mesh network links in this embodiment. In other embodiments, some or all of the communication links 140 use wired communications such as Ethernet (802) or Internet (or ATM, or fibre, or DSL etc.) connections.

The specific examples will focus on the detection of RADAR signals. More generally, similar approaches may be used to detect any extra system signal that needs to be detected reliably, typically because it has a frequency band overlapping the channels used in the RLAN system 100 thereby affecting transmission over the overlapped channels.

Figure 2:
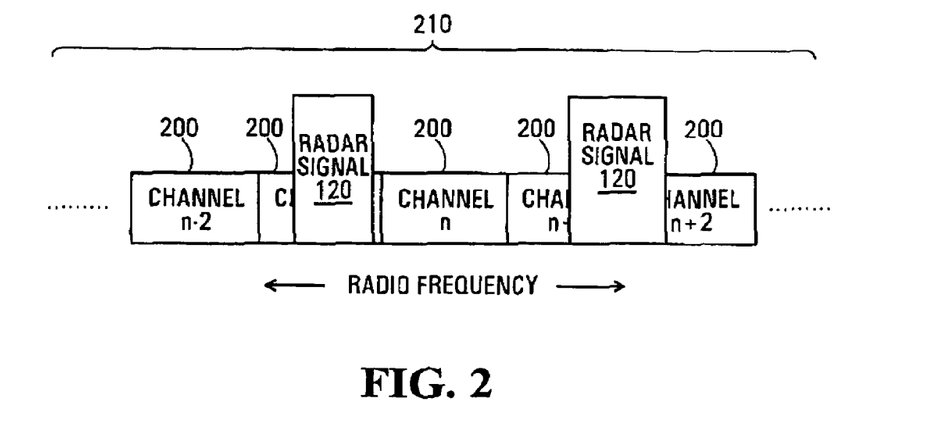
FIG. 2 an example of an overlap of RADAR signals of FIG. 1 and RLAN channels used by the RLAN system of FIG. 1.

Referring to FIG. 2, shown is an example of an overlap of the RADAR signals 120 of FIG. 1 and RLAN channels 200 used in frequency by the ELAN system 100 of FIG. 1. RADAR transmissions from the RADAR system 160 have a different channel plan than transmissions from the RLAN system 100. A RADAR signal may overlap one or more RLAN channel. This is shown in FIG. 2 where each RADAR signal 120 overlaps multiple RLAN channels 200. In some implementations there are 12 RLAN channels in the 5,470-5.725 GHz band and four RLAN channels in the 5.250-5.350 GHz band. Other channel plans may alternatively be used. Detection of the channels 200 being blocked by the RADAR signals 120 allows an RLAN system to avoid using these channels and make use of other channels to avoid deleterious effects of the RADAR signals.

In some embodiments of the invention, pattern matching is used to detect the RADAR signals. This will now be described with reference to FIGS. 3, 4, 5A, and 5B.

Figure 3:
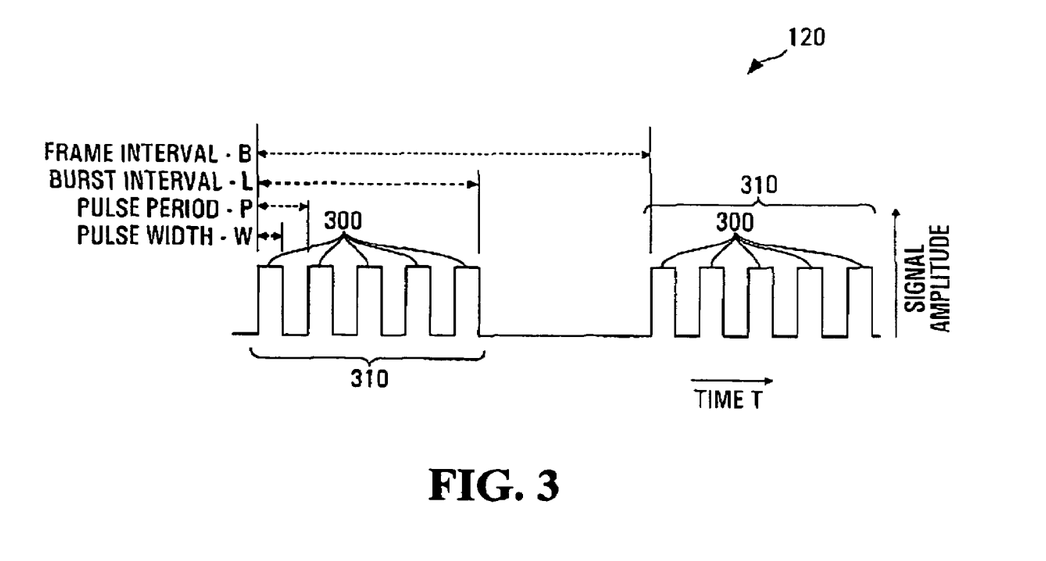
FIG. 3 is a general format of one of the RADAR signals of FIG. 1 to be detected.

Referring to FIG. 3, shown is an example of a format of one of the RADAR signals 120 of FIG. 1 to be detected. The RADAR signal 120 consists of a short burst 310 of pulses 300 with a burst interval L. The bursts 310 are repeated with a frame interval B. The pulses have a pulse width W and a pulse period P. The pulse width is typically between 1 and 100 microseconds in duration with the pulse period P typically in the range between 250 microseconds and 5 milliseconds. The frame intervals vary between 2 and 60 seconds and the pulse bursts 310 contain between 5 and 20 pulses, five pulses 300 being shown for each pulse burst in the illustrated example. It is to be clearly understood that RADAR signals having other formats may be present. The particular format of the RADAR signal to be detected is used in pattern matching.

Figure 4:
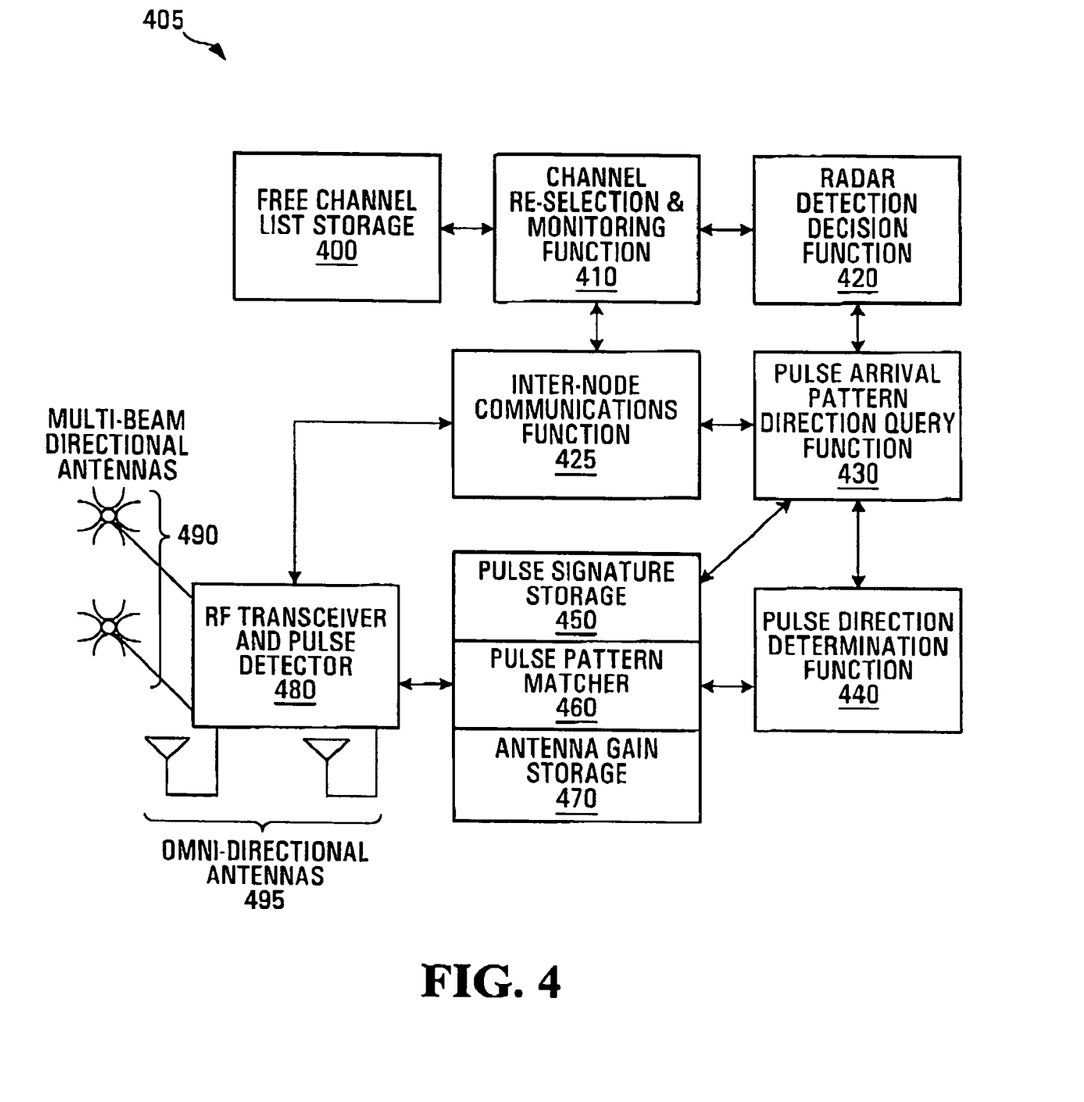
FIG. 4 is a functional block diagram of an apparatus provided by an embodiment of the invention and used for RADAR detection and channel monitoring and re-selection.

Referring to FIG. 4, shown is a functional block diagram of an apparatus 405 provided by an embodiment of the invention and used for RADAR detection and channel monitoring and re-selection. The apparatus has a free channel list storage 400, a channel re-selection and monitoring function 410, a RADAR detection function 420, an inter-node communications function 425, a pulse arrival pattern direction query function 430, a pulse direction determination function 440, a pulse signature storage 450, a pulse pattern matcher 460, an antenna gain storage 470, and an RF (Radio Frequency) transceiver and pulse detector 480. The apparatus 405 can be used for example in each RLAN node A-J of FIG. 1. Furthermore, it is to be clearly understood that the functionality of apparatus 405 can be used in combination other functionalities and elements that might be contained in the RLAN nodes A-J. Preferably, the functions 410, 420, 425, 430, 440, 460, and storages 400, 450, 470 are implemented as software and memory functions in a computing device already contained in an RLAN node. The apparatus 405 also has multi-beam directional antennas 490 and omni-directional antennas 495. Two multi-beam directional antennas 490 and two omni-directional antennas 495 are shown in the example. The multi-beam directional antennas 490 and the omni-directional antennas 495 are used to receive communication signals between RLAN nodes and for detecting extra-system system signals such as RADAR signals for example.

The illustrated example features multiple multi-beam directional antennas, and multiple omni-directional antennas. Multiple omni or multiple directional antennas may be used to provide transmission diversity. More generally, a given implementation may feature only an omni-directional antenna or antennas, or only a multi-beam directional antenna or antennas or a combination of one or more omni-directional antennas and multi-beam directional antennas. Omni antennas are more or less equally sensitive to signals received from any direction (usually considering only the horizontal plane). Directional antennas are designed to be more sensitive to signals received from one direction (unfortunately, they are not perfect, and so still have some poorer sensitivity to signals received from directions other than their primary focus). As the RADAR system may be located in any direction with respect to the RLAN device, the use of an omni-directional antenna provides (approximately) equal sensitivity to RADAR signals in any direction. Some existing RLAN equipment and mesh network systems are equipped with omni antennas for their RLAN transmissions, and these may be readily used for RADAR detection.

Some other systems use a set of directional antennas which, because of their directionality, reduce the amount of interference one of the RLAN units causes to others nearby. To sense a RADAR in any direction, a device equipped with directional RLAN antennas has at least three choices to provide omni coverage of RLAN signals;

a) it may be equipped with an additional omni antenna to be used to sense the RADAR signals;

b) it may use its directional antennas sequentially (or simultaneously if equipped to function as such) to sense in each direction for a RADAR signal;

c) it may electrically combine the signals from multiple directional antennas to synthesize an omni-directional pattern and hence look in all directions at once. This technique enables looking in all directions at once, and saves the time required to step through looking in each direction sequentially.

In the detailed examples given below, information about signals detected from multiple RLAN nodes is combined to give a detection result with increased reliability and decreased probability of false alarm. The aspect of the method of confirming detection through the use of simultaneous reception at multiple nodes is equally applicable for devices equipped with omni antennas and/or directional antennas with omni function or devices with both types of antennas. The aspect of the method invention that confirms the reception of an external signal through simultaneous reception at multiple nodes from the same direction requires the use of directional antennas such as multi-beam directional antennas.

Signals received at a given node's antennas are detected at the RF transceiver and pulse detector 480 where RADAR pulses and noise pulses, for example, are detected.

In some embodiments the antennas of a given node may have different gains. For example, in some implementations the omni-directional antennas 495 have a lower gain than the multi-beam directional antennas 490. As such, in some embodiments gain compensation is performed on detected signals. For example, respective gain compensations of the antennas 490, 495 can be stored in antenna gain storage 470. These gain compensations are then applied to a received signal strength measurement to determine the signal power. This allows a true strength of the detected signal to be compared against a signature threshold even though different antennas are used for reception. The detected signals are processed by the pulse pattern matcher 460 to determine if a pulse duration, a pulse repetition interval, a number of pulses and a burst frame interval correspond to a defined RADAR signature. Information on the detected pulses is stored in the pulse signature storage 450. The pulse arrival pattern direction function 430 determines if a locally detected pulse is a candidate RADAR signal and if so, the apparatus 405 sends queries requesting information on detection results to its neighbouring nodes using the inter-node communications function 425. The queries are sent as messages via the RF transceiver and pulse detector 480. Any appropriate message protocol can be employed. Internet Protocol (IP) peer-to-peer messaging is an example.

Using information from neighbouring nodes, the RADAR detection decision function 420 makes a decision as to whether a RADAR signal has been detected. For example, if a majority of the neighbouring nodes detect similar signals, the decision can be made that such a signal has been detected. Upon making such a decision the channel re-selection and monitoring function 410 looks up in the free channel list storage 400 which channel(s) are free to be used and instructs the inter-node communications function 425 to communicate with the neighbouring nodes to select a new channel from the available channels.

Preferably, the directions from which the pulses are detected in various RLAN nodes are used to help determine whether they are in fact RADAR pulses. As discussed above, this is only possible in embodiments with directional antennas. As will be discussed in further detail below, in some embodiments the antennas 490 are arranged for detection of the direction of arrival of a received signal and the direction of arrival depends on which antenna a signal is received. The pulse direction determination function 440 uses an antenna identifier, such as an antenna number for example, to identify the antenna on which the signal is received. The pulse direction determination function 440 also provides instructions to the inter-node communications function 425 for querying neighboring nodes for information on the direction of arrival of signals at the neighboring nodes. The pulse direction determination function 440 then makes use of this information to determine if there is a common direction of arrival for the pulses.

The channel re-selection and monitoring function 410 also allows the RF transceiver and pulse detector 480 to monitor unused channels, log channels that are free of RADAR signals, and to record an identification of the free channels in the free channel list storage 400 so that they may be used when a new free channel is needed, for example when a channel in use becomes blocked by detected RADAR signals.

The apparatus 405 of FIG. 4 shows a specific arrangement of functions for processing and storage. More generally, this functionality can be re-arranged in any suitable way using any combination of one or more of hardware, software and firmware. Depending on a given implementation, some signalling may be different from that shown in FIG. 4, and may not even be required if functions are merged or omitted.

The apparatus 405 of FIG. 4 is shown as being integrated within an RLAN node. This provides a cost-effective arrangement as RADAR detection and RLAN coverage is provided in the same device. However, in some implementations it may be desirable to provide monitoring devices separate from RLAN nodes. Furthermore, with reference to FIG. 1 in some implementations the functionality of apparatus 405 is implemented in each one of RLAN nodes A-J. However, in other implementations there are different classes of nodes only some of the RLAN nodes A-J are equipped with the functionality of apparatus 405. Such RLAN nodes form a perimeter of the RLAN network 105 to provide a "fence" of detection about the coverage area 150. The RLAN nodes forming the perimeter scan for RADAR signals, and inform interior RLAN nodes if a RADAR signal is detected. This approach is advantageous in that the interior RLAN nodes are not burdened by monitoring, detection, and filtering processes. Thus, their resources can be devoted to RLAN traffic. Such a hybrid approach may be advantageous for some large networks, with only RLAN edge nodes at a perimeter of an access network performing RADAR detection, and interior RLAN nodes in the interior handling traffic only. Since RLAN edge nodes in a network typically handle smaller amounts of traffic than those of interior edge nodes, their performance is not compromised by the additional RADAR scanning and monitoring as the case may be for interior RLAN nodes. The RLAN edge nodes may be designated individually to provide RADAR detection functionality. Alternatively, the RLAN nodes may automatically determine whether they are edge or interior nodes based on their interconnectivity within the RLAN network. The RLAN edge nodes, for example, might have only a single network interconnection link to the interior of the network, whereas the interior RLAN nodes might have multiple links. Furthermore, in some implementations once an RLAN node determines it is an RLAN edge node it automatically assumes the role of RADAR detection functionality. Similarly, if the RLAN node determines it is an interior RLAN node it automatically assumes a non-monitoring role and relies on the RLAN edge nodes for RADAR detection.

In the apparatus 405 of FIG. 4, information on channels blocked by RADAR signals, free channels and the ongoing detection of RADAR events is maintained locally. With reference to FIG. 1, in some implementations each one of RLAN nodes A-J maintains this information locally. Since the additional memory required in each node to implement RADAR detection is quite small, this approach of storing the information locally is cost-effective. However, the distributed storage of the information does require query/response communications between nodes to make decisions on the use of channels. In some embodiments of the invention, to reduce inter-node communications overhead, information on channel usage is stored in one or more central units. In some embodiments of the invention these units are designated nodes in RLAN network and/or server/storage units. The server/storage units might be part of an associated communications network and a Network Management System (NMS) for the RLAN network for example.

Methods for extra-system signal detection will now be discussed in further detail with reference to FIGS. 5A, 5B, 6, and 7.

Figure 5A:
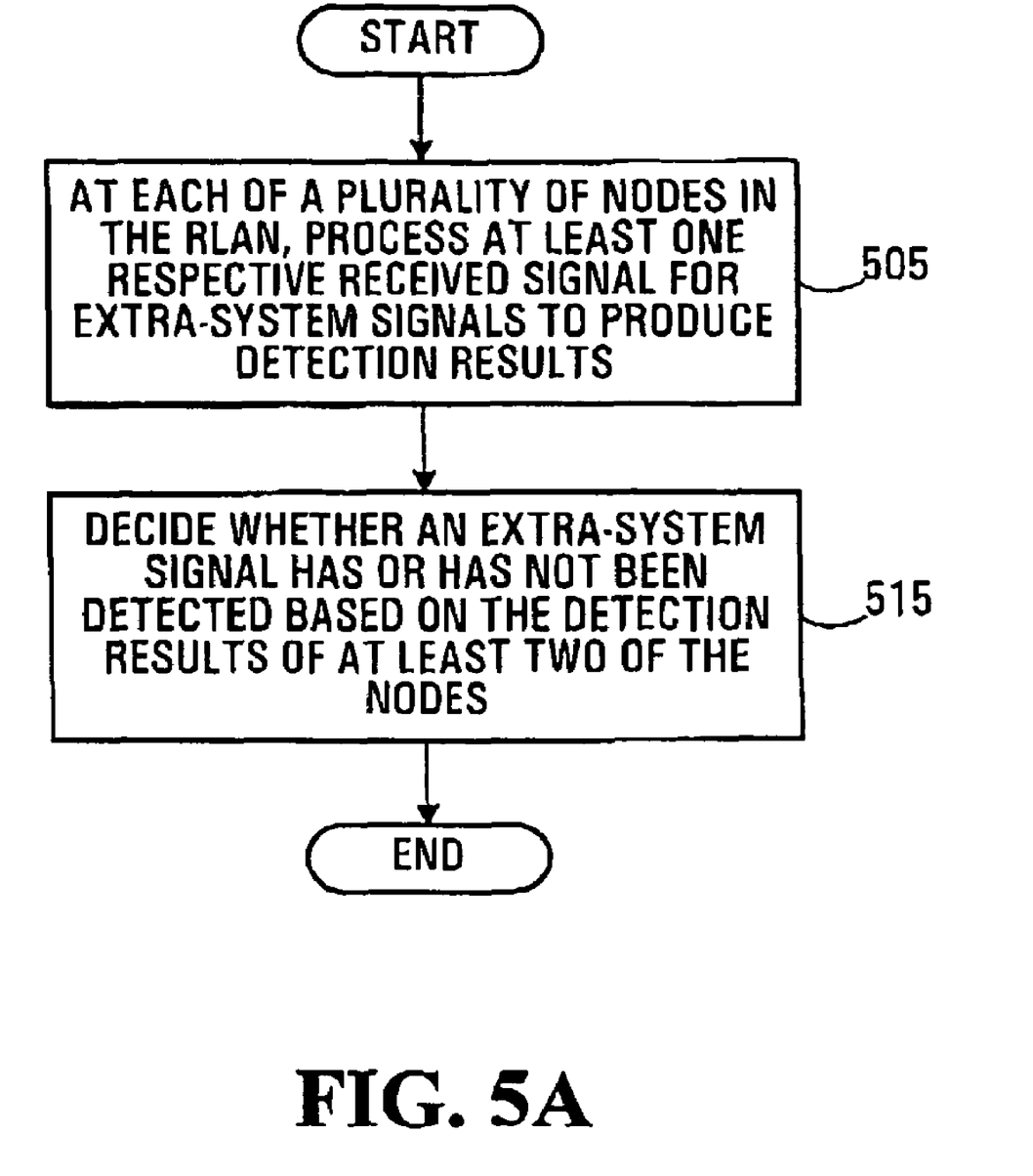
FIG. 5A is a flow chart of a method of detecting extra-system signals in a multi-node RLAN, in accordance with an embodiment of the invention.

Referring to FIG. 5A, shown is a flow chart of a method of detecting extra-system signals in a multi-node RLAN, in accordance with an embodiment of the invention. At step 505 at each of a plurality of nodes in the RLAN, at least one respective received signal is processed for extra-system signals to produce detection results. At step 515, a decision is made as to whether an extra-system signal has or has not been detected based on the detection results of at least two of the nodes.

The method of FIG. 5A can be implemented, for example, in the RLAN system 100 of FIG. 1. Furthermore, there are a number of ways of implementing the method of FIG. 5A. One example implementation will now be discussed with reference to FIG. 5B.

Figure 5B:
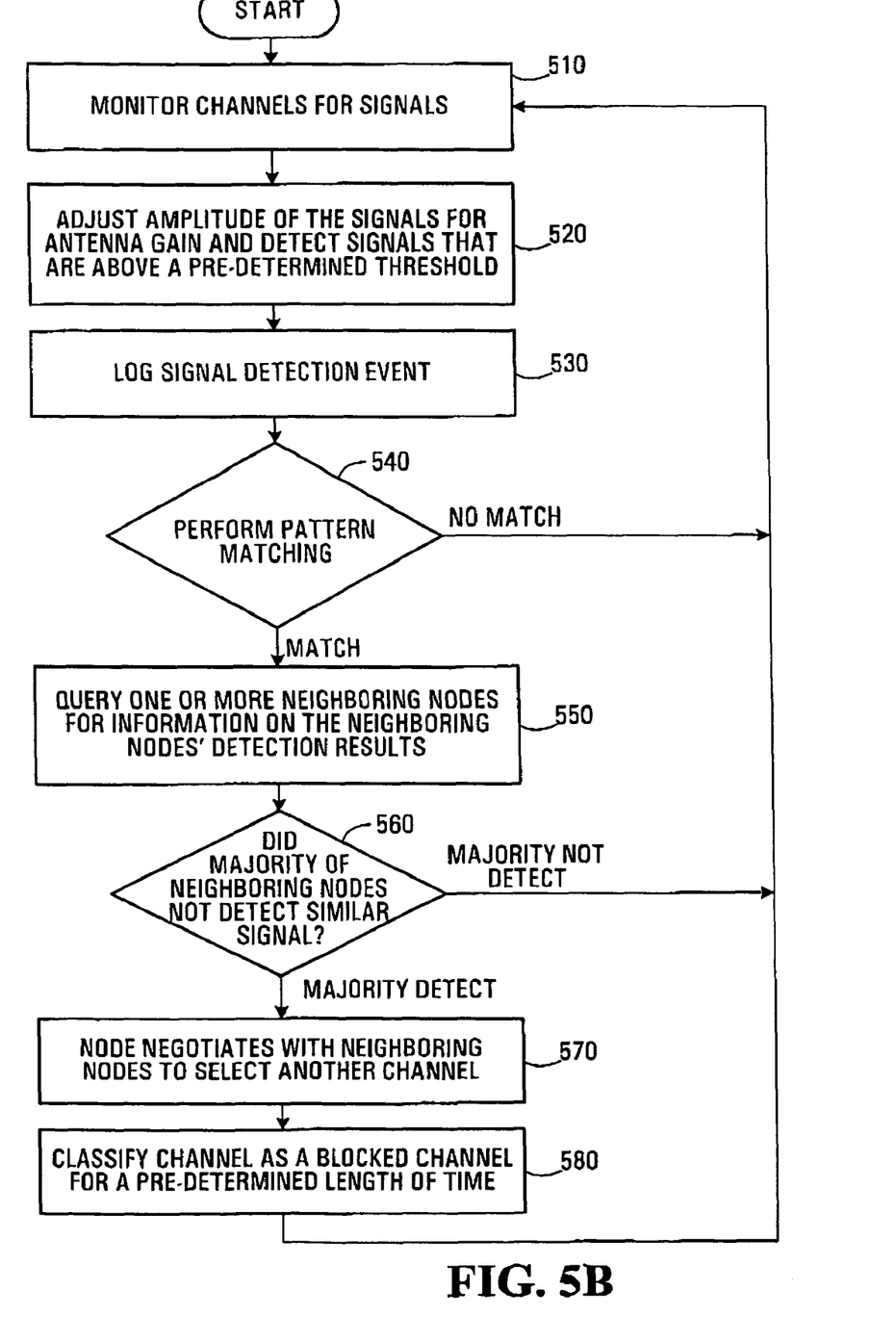
FIG. 5B is a flow chart of a method used by individual nodes in implementing the method of FIG. 5A, in accordance with an example implementation.

Referring to FIG. 5B, shown is a flow chart of a method used by individual nodes in implementing the method of FIG. 5A, in accordance with an example implementation. At step 510, the node monitors one or more channels for signals. At step 520, signal amplitudes of the signals are adjusted to compensate for antenna gains of omni-directional and/or multi-directional antennas at which the signals are detected. Signals having an amplitude above a predetermined threshold are detected. At step 530 a signal detection event is logged when a new signal is detected.

In the pattern matching process, a newly detected pulse is checked to see if it helps to complete a pattern ("signature") that may involve the pulse duration, pulse repetition interval, number of pulses and frame interval. The signature patterns can only be detected across a number of received pulses. The detection is made more difficult by the possibility that there may be more than one pattern present at the same time and there are competing signals.

Logging signals when they are received is part of one concept of pattern matching. Each newly received pulse is logged and then the pattern matching process examines the log to see if a pattern is emerging (or has emerged). The information may also be shared with other nodes. This sharing may enable a pattern to be better recognized. Individual pulses may be missed or not detected at a node (perhaps because it was busy transmitting and so could not receive RADAR pulses) and the sharing of pulse detection information (i.e. logs) from other nodes may fill-in-the-blanks to uncover a RADAR signature.

At step 540 the signal pattern of the detected signal, which includes for example any one or more of a signal strength, a pulse width, a pulse repetition rate, and a frame interval is compared against defined RADAR signatures. If the signal pattern of the detected signal does not match the defined pattern, channel monitoring is resumed (step 510). If there is a match then at step 540 the node queries one or more neighboring nodes for information on the neighboring nodes' detection results. At step 560, based on the detection results from the neighboring nodes, if a majority of the neighboring nodes has not detected the same signal the monitoring of channels of step 510 resumes; otherwise, the node negotiates with the neighboring nodes to select another channel (step 570). At step 580 the channel being blocked by the detected signal is classified as a blocked channel for a predetermined period of time, and step 510 is repeated.

Example implementations of each one of steps 510, 540, 550, 560, 570, and 580 of FIG. 5B will now be described in further details.

Regarding step 510, in an example implementation the monitoring of channels for signals is performed at a receiver at the node. The receiver listens for signals while the node is not sending or receiving packets, such as 802.11 radio packets for example. While monitoring channels that the node is using for traffic the node makes use of directional antennas associated with communications links with its one or more neighboring nodes. As will be discussed in further details below, in some implementations while scanning unused channels the node makes use of directional antennas in order to determine the direction of arrival of signals. The threshold for detection of the signals is adjusted according to antenna gain. In some implementations the node uses more than one radio for traffic and monitoring, and the monitoring and communications traffic tasks are shared among the available radio units. Sharing the scanning of unused channels among the node and neighboring nodes lessens the burden on individual nodes to scan all the channels they are not using, and hence avoids resources from being taken up for monitoring leaving the resources available for handling network traffic.

Regarding the pattern matching step (step 540), this step involves comparing for example any one or more of a signal strength, a pulse width, a pulse repetition rate, and a frame interval of the detected signal against corresponding detection signatures of RADAR signals. In some implementations, a plot of an inter-arrival time of all pulses of the detected signal received over a pre-determined period of time of a few minutes for example is used to determine if the pulses are part of a RADAR pattern or simply noise interference.

The inter-arrival time refers to the time between the arrival of pulses. Studying the inter-arrival time may be used as one way to detect the pulse repetition interval even when all the pulses have not been detected. One method, when a new pulse above the detection threshold is detected, is to calculate the time difference between the new pulse arrival time and all the recent pulse arrival times in the log (i.e. the past minute's list of received pulses). A histogram, or frequency count, may then be created by binning all the differences. For example the first bin of the histogram may count all the occurrences of time difference between 0 and 5 microseconds, bin 2 those between 5 and 10, three those between 10 and 15, etc. If the pulses are random in occurrence, the bins after receipt of many pulses will be about equally filled. However, if some or all of the pulses are arriving at some fixed rate, then some bins will show higher counts. These will indicate the pulse period and multiples there of, even if some of the pulses in the bursts were not received.

Regarding step 550, the detection results obtained from the neighboring nodes may include for example a detection signature from the neighboring nodes. In some implementations the detection results also include an indication of one or more of a time of arrival and a direction of arrival.

At step 560, the detection involves a decision based on a majority of neighboring nodes detecting the same pattern. In some implementations a majority is considered to be more than one-half of the neighboring nodes that have monitored the same channel and have detected the same pattern; however, it is to be clearly understood that a positive detection result can be made on any implementation specific basis, majority rule being but one example. For example two or more neighbouring nodes in agreement may be deemed sufficiently reliable. Furthermore, in some implementations the decision to detect an extra-system signal is made when a majority of the neighboring nodes in the network detect a signal with a similar signature at substantially the same time. In yet other implementations the decision to detect an extra-system signal is made when a majority of neighboring nodes in the network detect a signal with a similar signature at substantially the same time and/or substantially the same direction. Once again, the detection, direction and timing information of multiple nodes can be combined in many ways to reach a decision.

In some implementations the node and its neighboring nodes maintain locally a list of available channels referred to as Free channels, and at step 570 the node communicates with the neighboring nodes to decide which Free channel to select for communications. In such implementations, maintaining the list preferably involves exchanges of Free channel information between nodes.

In some implementations, at step 580 the channel on which the signal is detected is classified as a blocked channel for a predetermined length of time. The pre-determined length of time is for example 30 minutes. It is to be clearly understood, however, that any suitable length of time can be used. After classifying the blocked channel the node resumes monitoring of the blocked channel and other channels (step 510) in order to detect re-occurrences of the RADAR signatures and/or new occurrences. If none are detected on the blocked channel, the channel will be placed back in the free channel list after the pre-determined length of time, for example after half an hour.

As discussed above, nodes can be used to perform extra-signal detection by detecting whether received signals at the nodes are being detected from the same direction.

Figure 6:
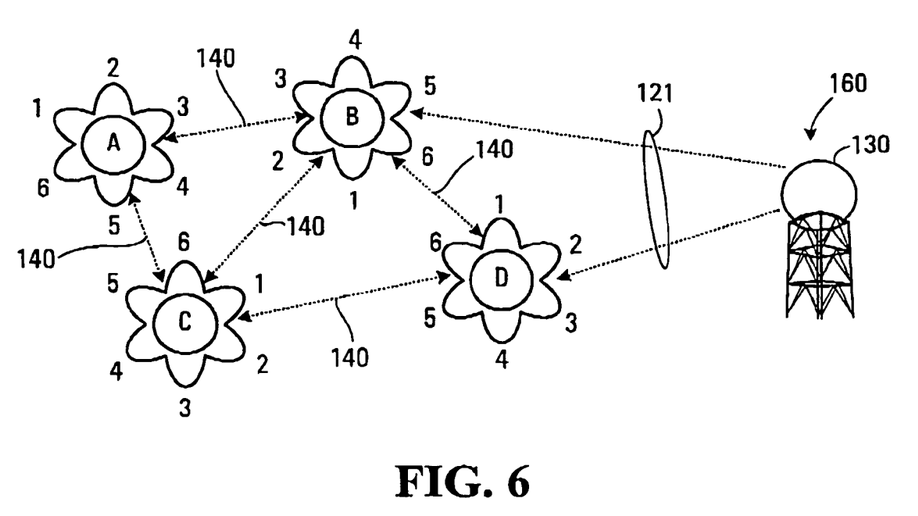
FIG. 6 is a portion of the RLAN system of FIG. 1 illustrating an example of how neighboring nodes determine whether received signals are being detected from the same direction among neighbouring nodes.

Referring to FIG. 6, shown is a portion of the RLAN system 100 of FIG. 1 illustrating an example of how neighbouring nodes determine whether received signals are being detected from the same direction among the neighbouring nodes. In FIG. 6 RLAN nodes A-D are shown as neighbouring nodes; however, it is to be clearly understood that this is an example only and that any other set of at least two nodes can be used. The RLAN nodes A-D have multiple directional antennas. As shown in FIG. 6, each RLAN node A-D is fitted with six antennas, each identified with an antenna number 1-6. It is to be clearly understood that more or fewer antennas can be used. The orientation of the antennas among the RLAN nodes A-D is random in that there is no correlation in the way antennas from different RLAN nodes having the same antenna number are directed. The RLAN nodes A-D communicate with each other using communications links 140. The antenna numbers identifying the antennas to be used for the communications links 140, and which are pointing at each other, are known to each node. The determination of whether a signal has been detected by two nodes in substantially the same direction can be performed by performing an arithmetic operation on the antenna numbers of RLAN nodes A-D. This arithmetic operation involves, for example: 1) for each node, taking an antenna number $N_n$ of a neighbouring node which is used for the communications link 140 between the node and the neighbouring node and subtracting a local antenna number $N_l$ of the node used for the communications link 140 between the node and the neighbouring node; 2) adding 3; 3) adding an antenna number $N_s$ identifying the antenna at which a detected signal is received on that node; and 4) applying a modulo 6 (MOD6) operation on the result of step 3). The arithmetic operation provides a number $N_r$ given by $N_r=(N_n-N_l+3+N_s)MOD6$. If the two antenna numbers calculated in respect of two nodes agree (plus or minus one), the signals may be considered to have come from the same direction.

In the illustrated example, a RADAR signal 21 is shown being received by antenna 5 of node B and antenna 2 of node D. Nodes B and D communicate with each other using antennas 6 and 1 respectively. Thus:

$N_r(B)=(6-1+3+5) \bmod 6 = 1$ $N_r(D)=(1-6+3+2) \bmod 6 \; 0$

Since the two numbers are within one, the signals are said to have come from the same direction.

A specific example of a method of correlating directions/angles of arrival for detected RADAR pulses has been provided in the context of nodes having numbered antennas. More generally, any suitable method may be used. For example, in some implementations individual nodes determine an absolute angle of arrival for direct comparison with other absolute angles of arrival from other nodes. In some embodiments, the pattern detection alone is used to make a decision as to whether a detected signal is an intra-system or extra-system signal, and no direction correlation is required in such embodiments.

As discussed above, radio channels can have different statuses depending on whether they are being used and whether RADAR signals have been detected in connection with the channels.

Figure 7:
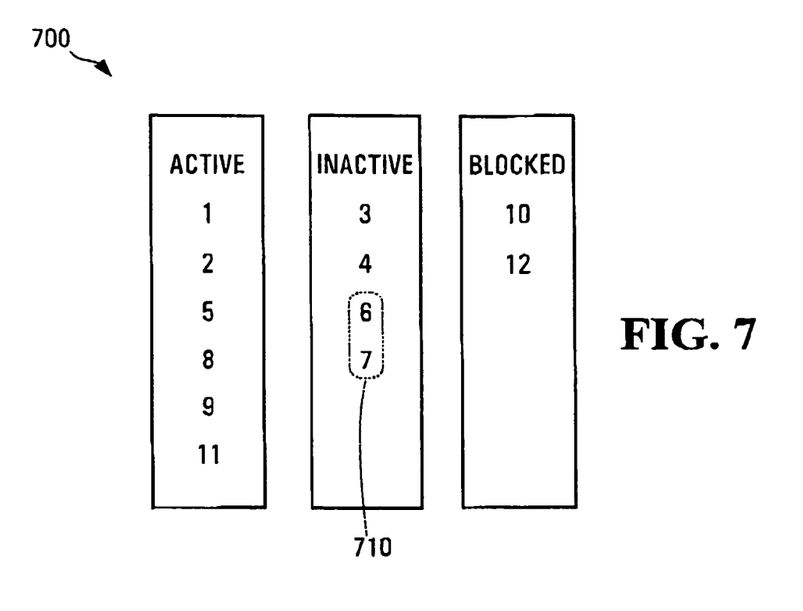
FIG. 7 is a list of radio channels used in the RLAN system of FIG. 1 illustrating an example classification of the radio channels.

Referring to FIG. 7, shown is a list of radio channels used in the RLAN system 100 of FIG. 1 illustrating an example classification of the radio channels. The list is generally indicated by 700 and is maintained by the RLAN nodes A-J. In this example there are twelve channels numbered 1-12. Classifications include but are not limited to Active, Inactive, Free, and Blocked. The example classification is used by the RLAN nodes A-J to manage the monitoring of the channels 1-12 across the network. The RLAN nodes A-J communicate among each other to maintain the list 700 locally. In another implementation the list 700 is stored at one or more of the RLAN nodes A-J designated to maintain the list 700, and/or at management servers for example.

Active channels are channels that are being used by the RLAN system 100 to carry inter-node communications. Inactive channels are channels that are not actively being used for inter-node communications but are being monitored for possible use as Active channels. Free channels form a sub-set 710 of the Inactive channels that have not had any detected RADAR signals for a pre-determined length of time. Such a length of time can be one minute for example; however, it is to be clearly understood that any suitable length of time can be used. Blocked channels are channels that were Active and for which extra-system signals have been detected causing a re-selection of a new channel. The Blocked channels remain in the Blocked list for a pre-determined length of time before being re-classified as being Inactive. The predetermined length of time is 30 minutes for example; however, it is to be clearly understood that any suitable length of time can be used.

In FIG. 7 shown is one of many possible assignments of the channels 1-12 in the 5.470-5.725 GHz band. According to the list 700, channels 1, 2, 5, 8, 9, and 11 are being used for communications among the RLAN nodes A-J, channels 3, 4, 6, and 7 are Inactive, and channels 10 and 12 are subject to interference from one or more extra-system signals from RADAR systems for example and are blocked. Channels 6 and 7, which are classified as being Inactive, have had no detectable RADAR activity for a predetermined period of time and are therefore classified as Free channels.

Referring back to FIG. 1, using the RLAN nodes A-J the RLAN system 100 monitors the Active channels 1, 2, 5, 8, 9, and 11 on an ongoing basis. The Active channels 1, 2, 5, 8, 9, and 11 are sufficiently monitored by the activity of receivers handling RLAN inter-node traffic. Preferably, the Inactive channels 3, 4, 6, and 7 are also monitored so that a new Free channel may be readily available if needed to replace one of the Active channels 1, 2, 5, 8, 9, and 11. In some implementations the Inactive channels 3, 4, 6, and 7 are also monitored by switching one or more RLAN receivers to the Inactive channels 3, 4, 6 and 7 on a regular basis to listen for extra-system signalling activity, such as RADAR activity for example. An efficient method for monitoring the Inactive Channels involves sharing the monitoring among the RLAN nodes A-J. As discussed above, the monitoring may be delegated to the RLAN nodes at an edge of the RLAN network 105 that have a smaller load on their radio resources for example. Since it is not necessary for every node to monitor every Inactive Channel 3, 4, 6, and 7, in some implementations the load is shared among edge nodes by having each edge node monitor a respective one or more of the Inactive channels 3, 4, 6, and 7. In some embodiments the RLAN nodes A-J in the RLAN network 105 negotiate together to assign the Inactive channel monitoring. Preferably, each Inactive channel 3, 4, 6, and 7 is monitored by at least two nodes. Thus, in an example implementation the monitoring of the inactive channels 3, 4, 6, and 7 is shared among the PLAN nodes A-J with each of the 9 RLAN nodes A-J monitoring one of the Inactive channels 3, 4, 6, and 7. In such an implementation, each RLAN node A-J shares monitoring results with its neighbouring RLAN nodes and/or with a network management centre (not shown). In this way sufficient monitoring coverage is provided with minimal impact on the use of radio resources across the RLAN network 105.

The Free channels 6 and 7, having had no extra-system signal activity detected for a pre-determined period of time, are available for use by the RLAN system 100 as a new inter-node communications channel if one of the Active channels 1, 2, 5, 8, 9, and 11 becomes blocked or if additional channels are required. In some implementations, at the time an Active channel becomes blocked if there are no Free channels available nodes re-select one of the Active channels 1, 2, 5, 8, 9, and 11. In such a case, preferably a particular Active channel is re-selected such that minimal intra-system interference results with nodes using the active channel.

Some embodiments rely on the signal having a predictable and known pulse duration and repetition rate and being received across several nodes at the same time. The signals of Ultra-wideband (UWB) radio systems and radio-navigation beacons can be detected in a similar manner.

There are some other signals that can be detected, most notably, TV transmissions (both analogue and digital), and mobile radio transmissions. These signals are typically continuous transmissions rather than pulses. As such, to detect these signals pattern matching to an amplitude profile of a TV broadcast or mobile system as defined in the Broadcast or mobile radio standards is employed. Having detected the signature of a TV or mobile system, a filtering process according a majority detection scheme using neighboring nodes as discussed above is used. Furthermore, as discussed above in some implementations the filtering process also makes use of correlations between the direction of arrival of detected signals.

In some embodiments, the directivity of the signals being consistent need not be a necessary condition for concluding an extra-system signal has been detected. Rather, the direction information can be another type of information consistent when coming to a concensus.

Numerous modifications and variations of the present invention are possible in light of the above teachings. It is therefore to be understood that within the scope of the appended claims, the invention may be practised otherwise than as specifically described herein.

We claim:

1. A method of detecting extra-system signals in a multi-node RLAN (radio local area network) comprising:
   at each of a plurality of nodes in the RLAN, processing at least one respective received signal for extra-system signals to produce detection results;
   deciding whether an extra-system signal has or has not been detected based on the detection results of at least two of the plurality of nodes;
   wherein processing at least one respective received signal for extra-system signals to produce detection results comprises performing pulse pattern matching;
   wherein the detection results for each node comprise a detection signature;
   wherein deciding whether an extra-system signal has or has not been detected based on detection results of at least two of the plurality of nodes comprises comparing the detection signature for at least two of the plurality of nodes to see if there is a substantial match.

2. The method of claim 1 wherein deciding whether an extra-system signal has or has not been detected is further based on information representative of a direction of arrival of the respective received signals.

3. The method of claim 2 wherein a decision that an extra-system signal has been detected requires that the direction of arrival information of the respective received signals be substantially consistent.

4. The method of claim 1 wherein the RLAN communicates queries about neighborhood detections and exchanges free channel information between nodes.

5. The method of claim 1 wherein the extra-system signal is a RADAR signal.

6. The method of claim 1 further comprising:
exchanging partial detection results among neighboring nodes so that gaps in a detected pattern might be filled in.

7. The method of claim 1 wherein an omni-directional coverage is achieved using one of:
an omni-directional antenna;
all of the beams of a multi-beam directional antenna collectively giving an omni-directional coverage;
some of the beams of each of a plurality of multi-beam directional antennas that collectively give an omni-directional coverage.

8. A method of detecting extra-system signals in a multi-node RLAN (radio local area network) comprising:
at each of a plurality of nodes in the RLAN, processing at least one respective received signal for extra-system signals to produce detection results;
deciding whether an extra-system signal has or has not been detected based on the detection results of at least two of the plurality of node;
wherein the decision that an extra-system signal has been detected is made when a majority of a node and neighboring nodes of the node in the network detect a signal with a similar signature at substantially the same time.

9. A method of detecting extra-system signals in a multi-node RLAN (radio local area network) comprising:
at each of a plurality of nodes in the RLAN, processing at least one respective received signal for extra-system signals to produce detection results;
deciding whether an extra-system signal has or has not been detected based on the detection results of at least two of the plurality of node;
wherein the decision that an extra-system signal has been detected is made when a majority of a node and neighboring nodes of the node in the network detect a signal with a similar signature at substantially the same time and substantially the same direction.

10. A method of detecting extra-system signals in a multi-node RLAN (radio local area network) comprising:
at each of a plurality of nodes in the RLAN, processing at least one respective received signal for extra-system signals to produce detection results;
deciding whether an extra-system signal has or has not been detected based on the detection results of at least two of the plurality of nodes
wherein each node has a plurality of directional antennas arranged to provide omni-directional coverage;
each node has active antennas which are being used for traffic;
each node has respective inactive antennas which are not being used for traffic;
in each node said at least one received signal is received using the respective inactive antennas.

11. The method of claim 10 wherein full omni-directional scanning is achieved at a system level by combining results from multiple nodes which have different sets of active antennas and inactive antennas, and by sharing the results system wide.

12. An RLAN system comprising:
a plurality of nodes;
the RLAN system configured to implement a method of detecting extra-system signals, the method comprising:
at each of the plurality of nodes in the RLAN system processing at least one respective received signal for extra-system signals to produce detection results;
deciding whether an extra-system signal has or has not been detected based on the detection results of at least two of the plurality of nodes;
wherein the plurality of nodes comprises at least two nodes of a first class performing extra-system signal scanning and at least one node of a second class that relies on the scanning performed by the at least two nodes of the first class.

13. The RLAN system of claim 12 wherein the plurality of nodes defines a coverage area having edges and an interior, the at least two nodes of a first class being arranged at the edges of the coverage area for providing a detection fence and the at least one node of the second class being in the interior of the coverage area.

14. The RLAN system of claim 12 wherein the at least two nodes of the first class automatically assumes the responsibility of monitoring functionality, and wherein the at least one node of the second class automatically assumes a non-monitoring role.

15. The RLAN system of claim 14 wherein each node of the plurality of nodes automatically detects one of an edge status and an interior status of the node according to a number of communications links with neighboring nodes of the node.

16. A node for participating in detecting extra-system signals in a multi-node RLAN (radio local area network), the node being adapted to:
process at least one respective received signal for extra-system signals to produce detection results; and
decide whether an extra-system signal has or has not been detected based on the detection results from at least one other node;
wherein processing at least one respective received signal for extra-system signals to produce detection results comprises performing pulse pattern matching;
wherein the detection results for each node comprise a detection signature;
wherein deciding whether an extra-system signal has or has not been detected based on detection results of at least two of the plurality of nodes comprises comparing the detection signature for the node and the at least one other node to see if there is a substantial match.

* * * * *

UNITED STATES PATENT AND TRADEMARK OFFICE
CERTIFICATE OF CORRECTION

PATENT NO. : 7,647,061 B1  Page 1 of 1
APPLICATION NO. : 11/085084
DATED : January 12, 2010
INVENTOR(S) : David Steer et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 1331 days.

Column 12, line 49, the expression reads

"$N_r(D)=(1-6+3+2) \bmod 6\ 0$" but should read

-- $N_r(D)=(1-6+3+2) \bmod 6=0$ --

Column 16, claim 12, lines 14-15, "...at each of the plurality of nodes in the RLAN system processing at least one..." should read -- ...at each of the plurality of nodes in the RLAN system, processing at least one... --

Signed and Sealed this

Tenth Day of August, 2010

David J. Kappos
*Director of the United States Patent and Trademark Office*